United States Patent [19]
Thomas

[11] Patent Number: 5,913,968
[45] Date of Patent: Jun. 22, 1999

[54] DEVICE FOR INJECTING FLUIDS INTO FOOD

[75] Inventor: Manfred Thomas, Versmold, Germany

[73] Assignee: Schröder Maschinenbau GmbH, Germany

[21] Appl. No.: 09/099,344

[22] Filed: Jun. 18, 1998

[30] Foreign Application Priority Data

Jun. 20, 1997 [DE] Germany .............. 197 26 187

[51] Int. Cl.[6] .................. A22C 17/00; A23L 1/31
[52] U.S. Cl. .................. 99/533; 99/487; 99/535
[58] Field of Search .................. 99/487, 532–535, 99/516, 494; 426/281, 231, 442, 652, 650, 264, 332, 541; 452/198

[56] References Cited

U.S. PATENT DOCUMENTS

| | | | |
|---|---|---|---|
| 3,377,989 | 4/1968 | Sandhage et al. ............ | 99/533 X |
| 4,437,397 | 3/1984 | Kawai ........................ | 99/535 X |
| 4,903,590 | 2/1990 | Muller et al. ................ | 99/487 |
| 4,924,771 | 5/1990 | Langen et al. ............... | 99/533 |
| 4,928,592 | 5/1990 | Moshier et al. ............. | 99/494 X |
| 5,142,971 | 9/1992 | Norrie ........................ | 99/487 |
| 5,275,095 | 1/1994 | Van Haren .................. | 99/533 |
| 5,638,744 | 6/1997 | Smith ......................... | 99/487 |
| 5,664,488 | 9/1997 | Smith ......................... | 99/487 |

FOREIGN PATENT DOCUMENTS 19530045   12/1996   Germany .

*Primary Examiner*—Timothy F. Simone
*Attorney, Agent, or Firm*—Rothwell, Figg, Ernst & Kurz, p.c.

[57] ABSTRACT

Device for injecting fluids into foods, with at least one fluid chamber into which is fed the fluid under pressure, with several hollow needles which each are connected with the fluid chamber or one of the fluid chambers via a valve device and movable in such a way that they puncture the foods, and with a control instrument for operating the valve devices dependent on the needle movement, wherein the valve devices are arranged on a detachable or swivellable cover of the appropriate fluid chamber.

10 Claims, 6 Drawing Sheets

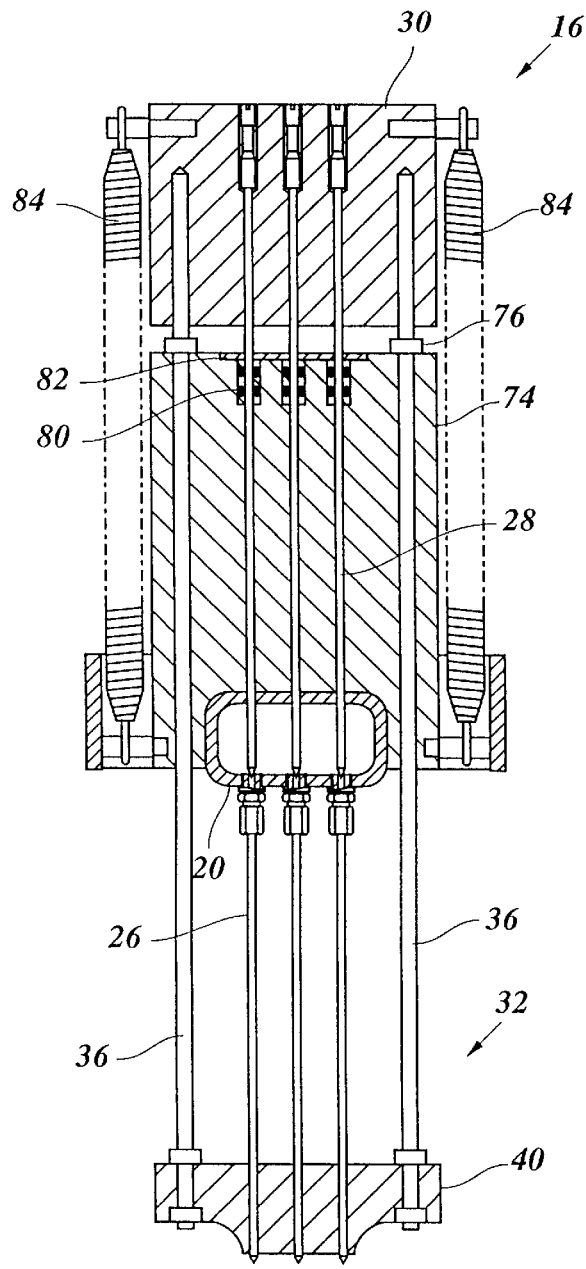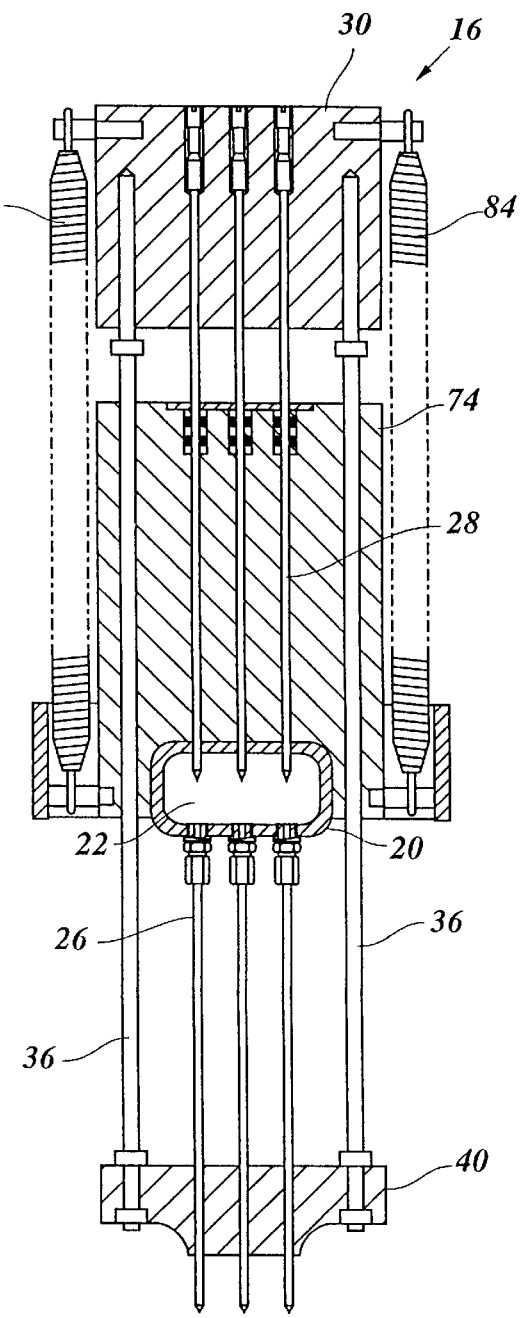

DEVICE FOR INJECTING FLUIDS INTO FOOD

BACKGROUND OF THE INVENTION

1. Field of the Invention

The invention concerns a device for injecting fluids into foods, with at least one fluid chamber into which the fluid is fed under pressure, with several hollow needles, each connected with the fluid chamber or one of the fluid chambers via a valve device and movable in such a manner that they puncture the food, and with a control instrument for operating the valve devices dependent on the needle movement.

2. Description of the Background Art

One example for a familiar device of this type is a curing machine, as described for example in DE 195 30 045 C1. This curing machine has a needle register with several vertically movable needles which run, leakproof on their upper ends due to opposite upper and lower walls, through the fluid chamber. The valve device is formed by a control board installed in the fluid chamber and interspersed with needles; this board is movable lengthwise along the needles and either closes or frees the needles' cross holes.

Recently fluids or brines that have a relatively high viscosity and therefore tend to obstruct or clog the hollow needles and respective valve devices have been used increasingly for the preservation of foods, particularly for curing meats.

SUMMARY OF THE INVENTION

Therefore it is the object of the invention to create a type of device as described above that distinguishes itself by allowing a faster and less complicated cleaning process.

According to the invention this task is performed by arranging the valve devices on a detachable or swiveling cover or top of the appropriate fluid chamber.

During operation of the device, the fluid chamber is closed tightly so that the fluid in the fluid chamber is put under pressure and can be injected into the food through the needles. When the needles and/or valve devices need to be cleaned, the cover or top are taken off or swung open to gain access to the fluid chamber and to the individual needles' orifices located in this fluid chamber. This facilitates considerably the rinsing and cleaning of the needles. Furthermore, in the case of a cover or cap that is removed or swung open, convenient access is gained to the valve device arranged on it so that the valve devices can be cleaned comfortably as well.

In a particularly preferred version, the valve devices are formed by valve needles that run in the cover or the upper wall of the fluid chamber in an axially movable way; in closed position, the valve needles close the upper ends of the needles which are open and serve as valve seat. During the cleaning process this has the advantage that the rinsing fluid can be fed directly from above into the open end of the needle without deviation and thus without loss of pressure. In such a cleaning procedure, the valve seat, which is formed directly by the upper end of the needle, can be cleaned at the same time. In the case of a swung open cover or detached cap, the valve needles are separated completely from the valve seats and can therefore be easily cleaned as well.

During operation of the device the suggested design has the advantage that with an open valve device, i.e. pulled back valve needle, the highly viscous fluid can flow directly from the fluid chamber into the upper open end of the needle, thus reducing flow resistance to a minimum. The fluid's total flow path is therefore limited by smooth walls and has no torn edges or dead spaces where deposits or incrustations of solid matter contained in or precipitated from the fluid could be formed.

BRIEF DESCRIPTION OF THE DRAWINGS

In the following the preferred version examples are explained more in detail with drawings. They show:

FIG. 5 a section of essential parts of a device in accordance with the second version;

FIG. 6 a device according to FIG. 5 during injection procedure; and

DETAILED DESCRIPTION OF THE INVENTION

Figure 1:
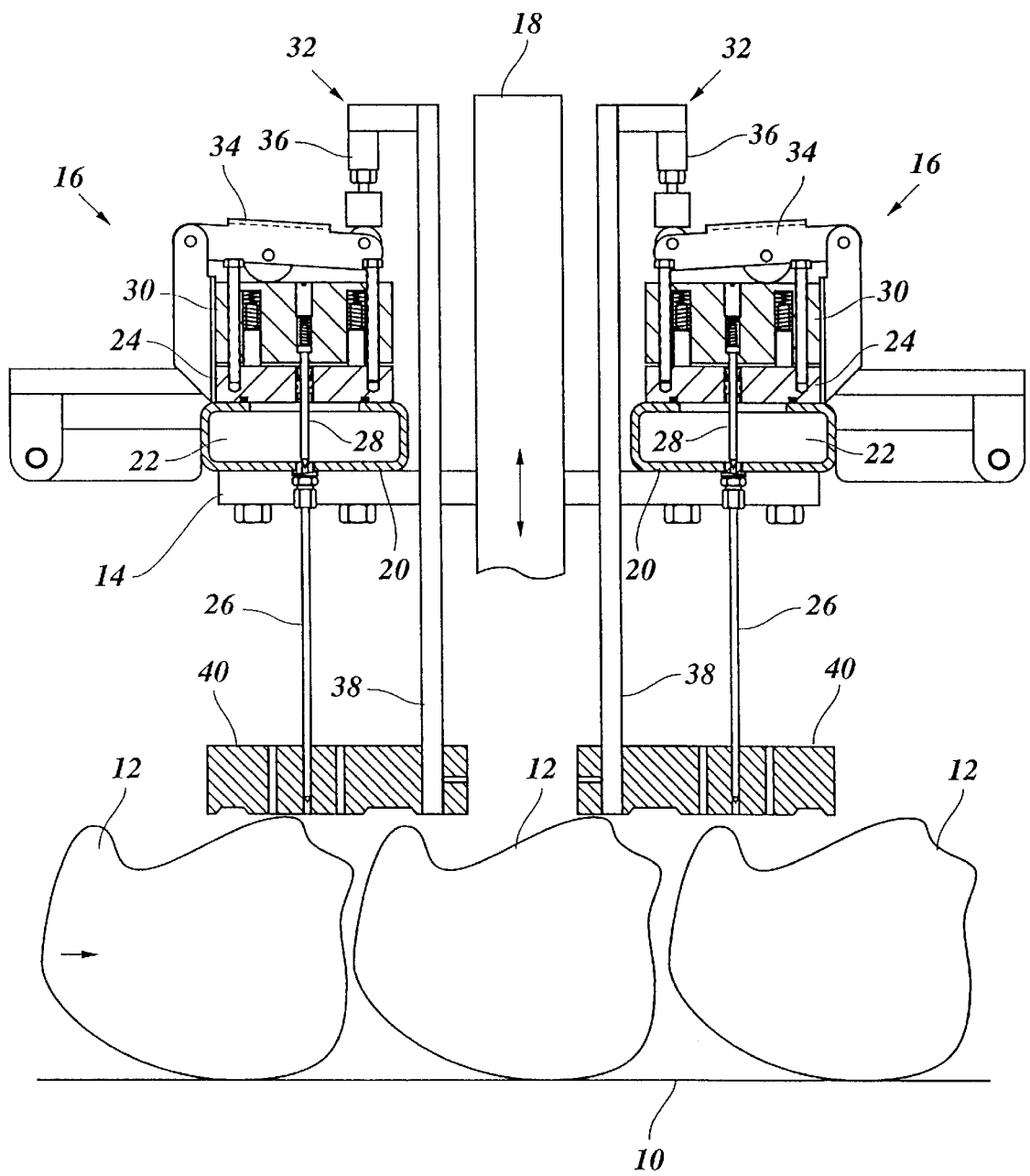
FIG. 1 a diagram view of the first device version.

The device indicated in FIG. 1 shows a conveyor 10, for example a conveying belt or a step conveyor, with which food items 12, e.g. pieces of meat, can gradually be fed in a horizontal direction. Via the conveyor, a carrier 14 is attached which in the example shown has two needle registers 16 and moves up and down lengthwise along a vertical column 18 with the help of a drive (not shown) according to the cycle of the conveyor 10.

Each needle register 16 has a trough 20—open on the top and stretching perpendicular to the projection plane in FIG. 1—which forms a fluid chamber 22 and can be closed pressure-sealed with a cover 24. In the bottom of the trough 20, several needles 26—arranged behind each other in the drawing—are fastened, stretching vertically towards the food items 12 and their upper open ends lying flush in the upper surface of the bottom of the trough 20. The upper open ends of the needles 26 each form a valve seat for a valve needle 28 that is vertically movable in the cover 24. The valve needles 28 form groups of, for example, ten valve needles each which are propped against a joint closing block 30 which is fastened in a vertically movable way on the upper side of the cover 24.

Each closing block 30 is allocated a control instrument 32 for controlling the opening and closing movements of the affected group of valve needles 28. Each control instrument 32 comprises one or more control levers 34 which are allocated each a pestle 36. The pestle 36 is fastened on the upper end of a vertically movable control bar 38 guided on the carrier 14; this control bar carries a pressure pad 40 on the bottom end for the food. The pressure pad 40 is interspersed by the needles 26 which are allocated to the affected closing block 30.

During operation of the device, the fluid chambers 22 are fed—under pressure—the fluid to be injected into the food items. The closing blocks 30 are prestressed elastically upward, but are kept in the lowered position through the control levers 34 since the weight of the control instruments 32 has an effect on the free ends of the control levers. The upper ends of the needles 26 are therefore kept closed by the valve needles 28.

When the carrier 14 is lowered, the needles 26 puncture the food items 12 while the pressure pads 40 are held back by the food items. The control bars 38 therefore move upward relative to the carrier 14 so that the pestles 36 release the control levers 34. As soon as the needles 26 puncture the food items 12, the closing blocks 30 therefore move upward, and the valve needles 28 release the upper openings of the needles 26 so that the fluid is injected into the food items 12.

When the carrier 14 then is moved upward again and the lower ends of the needles 26 emerge from the food items 12, the free ends of the control levers 34 again push against the pestles 36 so that the closing blocks 30 are pushed downward into closed position and therefore the upper ends of the needles 26 are closed again. During further upward movement of the carrier 14, the pressure pads 40 are moved upward again by the pestles 36 and the control bars 28 so that the food items 12 resting on the conveyor 10 can be moved along.

The mechanism described above thus ensures that the fluid is released via the needles 26 only when these needles actually puncture the food items.

Figure 3:
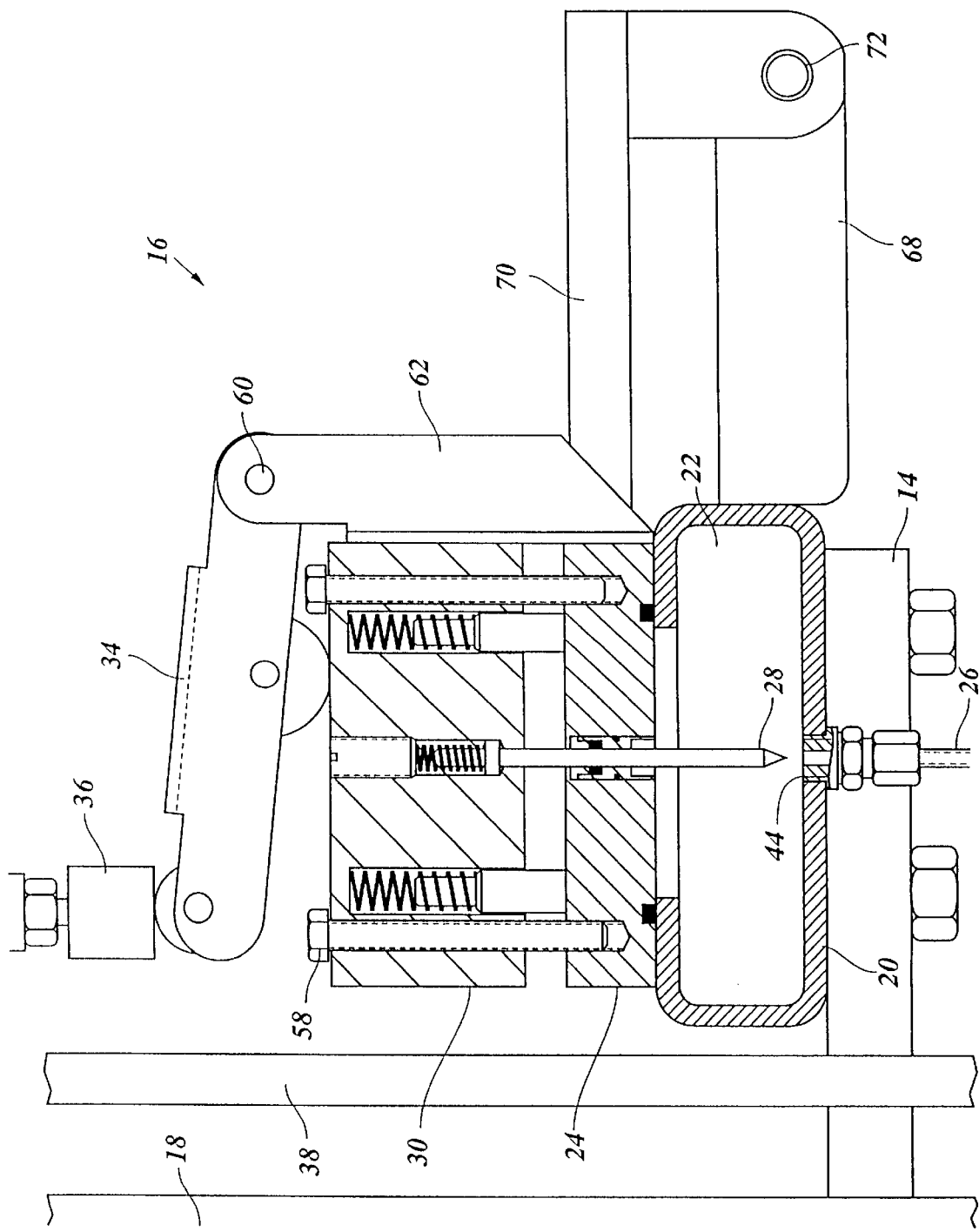
Figure 4:
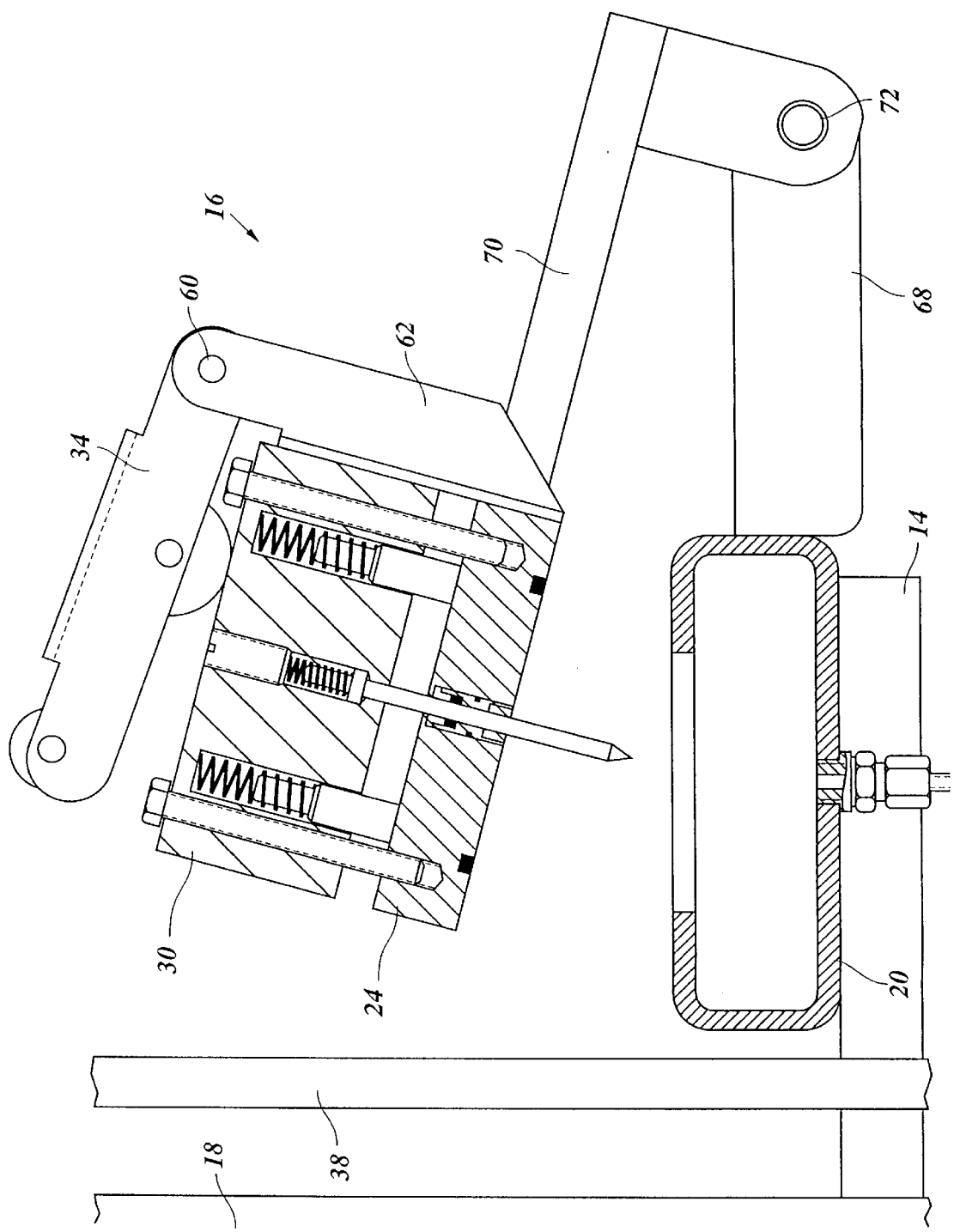

Set-up and procedure of the needle register 16 will be explained more in detail in the following with FIGS. 2 to 4.

The needles 26 are equipped with insert nuts 42 on the upper end which are screwed in flush with the bottom of the trough 20 and form the already mentioned valve seats 44 for the valve needles 28.

The cover 24 is fastened against the carrier 14 with screws 46 so that the trough 20 is clamped into a sandwich-like position and kept closed in a pressure-sealed manner. Guidance of the valve needle 28 through the cover 24 is sealed off with a sealing package 48. The upper end of the valve needle 28 rests in a bore of the closing block 30. An extended upper part of this bore contains a spring 50 which is propped against a collar of the valve needle 28 on the one hand and against a locking screw 52 screwed into the closing block on the other hand so that the valve needle 28 is prestressed against the valve seat 44 with adjustable closing pressure.

On the upper part of the cover 24 pilot pins 54 are arranged which mesh in with the appropriate pocket holes of the closing block 30 and guide the closing block in vertical direction. The pocket holes contain springs 56 which are propped against the pilot pins 54 and prestress the closing block 30 upward. The length of the closing block's 30 stroke is limited by screws 58 screwed into the cover 24.

The control lever 34 is fastened on the support 62 with a link 60 so that it can swivel; the support 62 itself is fastened on the cover 24. The pestle 36 affects a pressure roller 64 arranged on the free end of the control lever 34. Another pressure roller 66 located more closely to the joint 60 in the control lever 34 transfers and increases the power exercised by the pestle 36 onto the closing block 30 so that the valve needles 28 are kept in closed position against the power the springs 56 as long as the pestle 36 is lowered. The power of the pestle is mainly caused by the dead weight of the pressure pad 40 and the control bars 38, however it can be increased by adding springs, pneumatic cylinders or the like (not shown).

Figure 2:
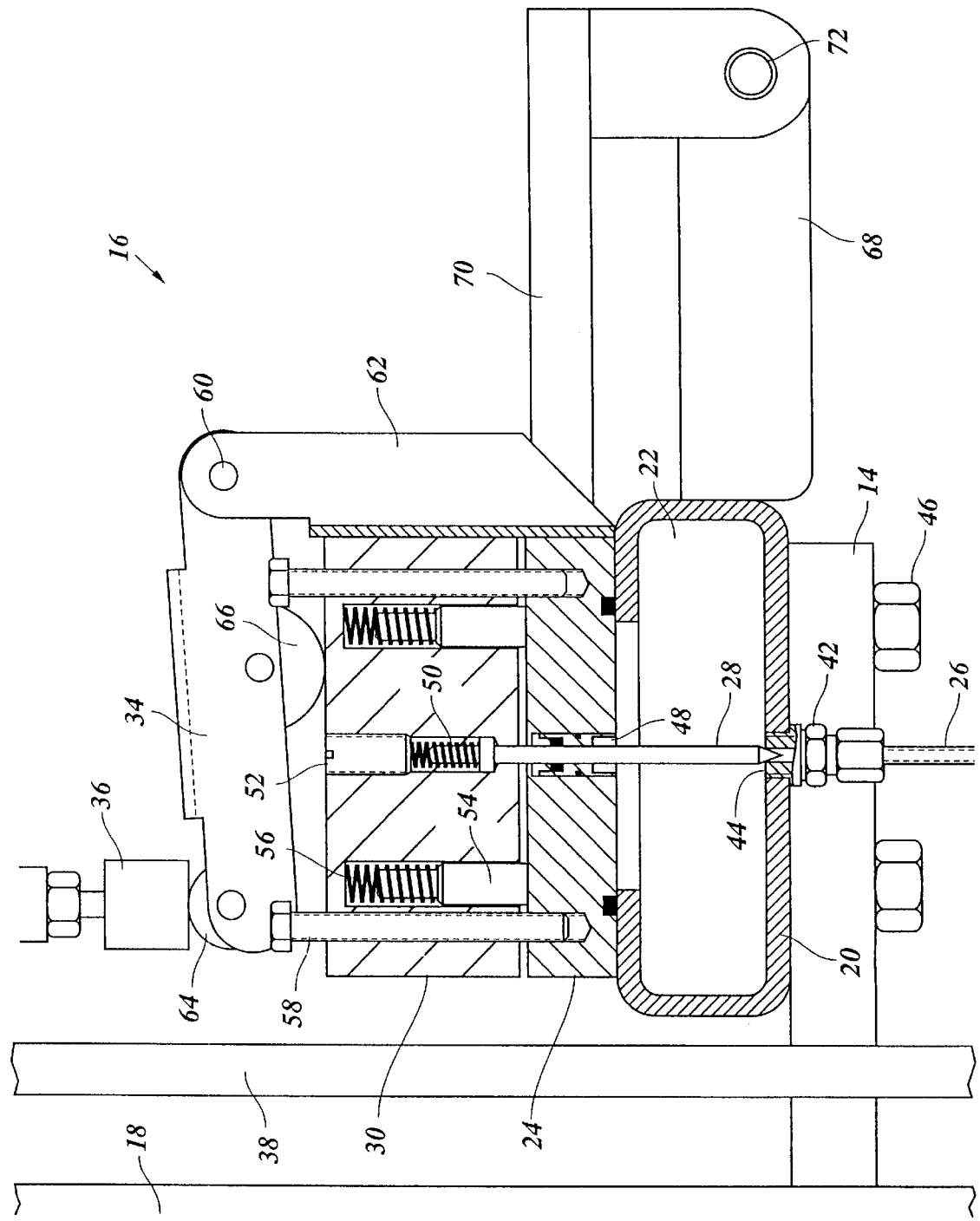
FIGS. 2 to 4 enlarged partial sections of a needle register of the device from FIG. 1 in different positions.

When the pestle 36 is raised by the pressure pad 40, the closing block 30 can move upward due to the effects of the springs 56 and swivel the control lever 34 clockwise in FIG. 2. During upward movement of the closing block 30, the valve needles 28 are carried by the collar on the valve needles so that the upper openings of the needles 26 surrounded by the valve seats 44 are released, as shown in FIG. 3.

On the trough 20 and the cover 24 parallel brackets 68, 70 protruding horizontally outward are fastened which are connected with each other on the free ends with a link 72. When the device needs to be cleaned, the cover 24 can be swiveled open together with the closing block 30, the support 62 and the control lever 34 after removal or lifting of the pestle 36 and loosening of the screws 46, as basically shown in FIG. 4. This way immediate access is gained to the upper openings of the needles 26 so that they can be rinsed with a cleaning fluid and/or a cleaning brush can be inserted into the bore of the needle 26 from above. The link 72 is on the same height as the tips of the valve needles 28. Due to the brackets 68, 70—during opening and closing of the cover 24—the pivoting radius of the valve needles 28 around the link 72 is increased to such an extent that the valve needles can move basically only vertically relative to the valve seat 44 so that the valve needles can exit freely out of the opening of the trough 20 and damage to the valve needles is avoided.

Figure 7:
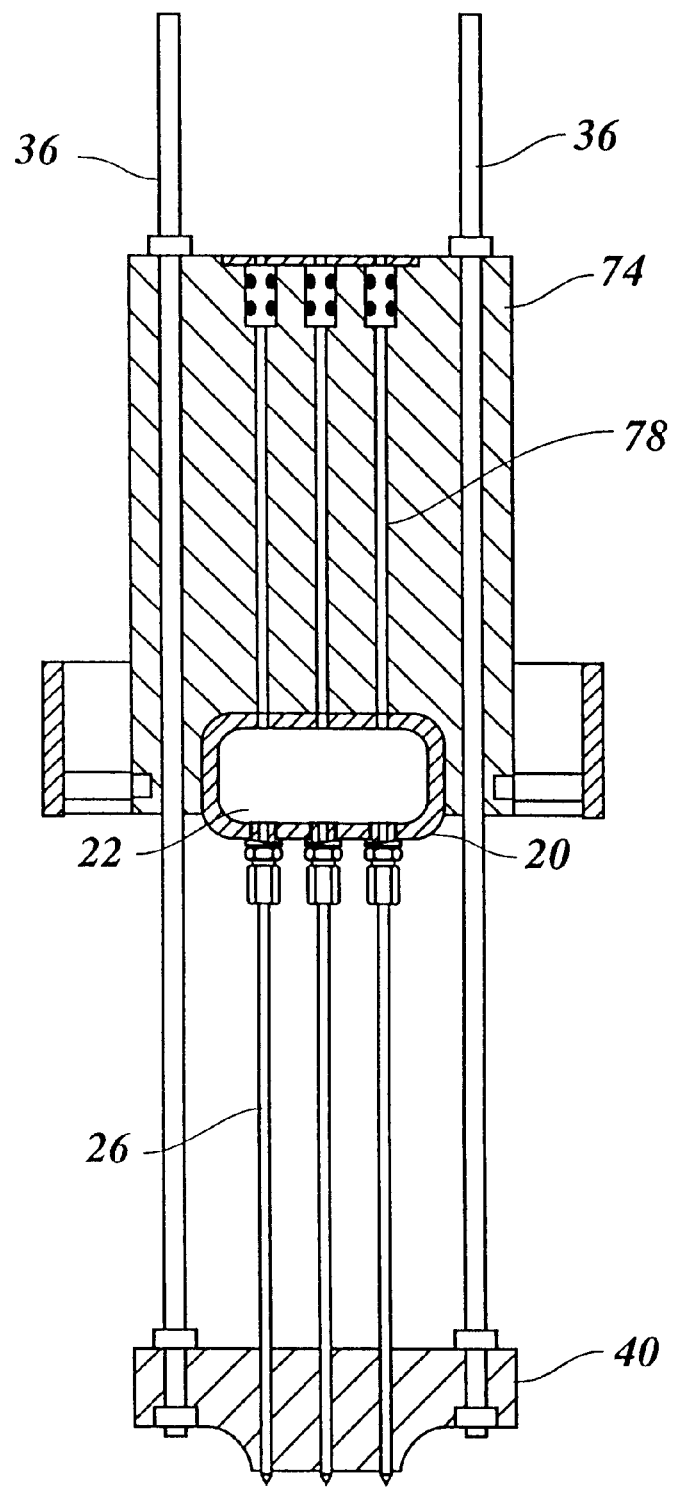
FIG. 7 the device according to FIG. 5 after removing the cap.

FIGS. 5 to 7 show a needle register 16 of a device in accordance with a modified version where the trough 20 is closed on the upper side and embedded in a guide block 74. Here, the closing block 30 forms a detachable cap that rests on the guide block 74. The control instrument 32 is formed by two pestles 36 guided vertically in the guide block 74; the pressure pad 40 is fastened on their bottom ends, and the closing block 30 is slipped onto their upper ends. Each pestle has a collar 76 which rests on the upper side of the closing block 74 in the position shown in FIG. 5.

The valve needles 28 are kept in the closing block 30 similar to the version example described above and each extends through an appropriate bore 78 of the closing block (FIG. 7). The bores 78 are each extended on the upper ends and contain a sealing package 80 for sealing the valve needle 28. The sealing packages are covered by a covering plate 82.

Between the closing block 30 and the guide block 74 tension springs 84 are stretched which pull the closing block against the guide block 74 so that the upper ends of the needles 26 are kept closed by the valve needles 28.

When the needle register 16 is lowered during an injection process, the pressure pad 40 is kept back by the food items and the guide block 74, the trough 20, and the needles 26 keep on moving downward by themselves, as shown in FIG. 6. Due to the pestles 36 the closing block 30 is raised from the guide block 74 so that the valve needles 28 release the upper openings of the needles 26. During further downward movement of the needle register, the valve needles 28 can pull back into the guide block 74.

When the needles 26 need to be cleaned, the tension springs 84 are disengaged, and the closing block 30 is pulled up with the valve needles 28. As shown in FIG. 7, the upper ends of the bores 78 are freely accessible so that a rinsing fluid and/or a brush can be introduced through these bores into the fluid chamber 22 and the needles 26. Preferably, a lance (not shown) is introduced from above through the bore 78 and put on the upper end of the appropriate needle 26 so that the affected needle can be rinsed better. Clogged areas of individual needles can thus be recognized immediately.

The invention claimed is:

1. A device for injecting fluids into food items, comprising:
   at least one fluid chamber into which a fluid is fed under pressure, and having a fluid chamber opening;
   at least one hollow needle connected to said fluid chamber and movable in such a way that said at least one hollow needle punctures a food item;
   at least one valve device communicating with said at least one hollow needle; and
   a control instrument for controlling said at least one valve device dependent on a movement of said at least one hollow needle, with said at least one valve device being arranged on a cover of said fluid chamber, with said cover and said at least one valve device positioned over said fluid chamber opening and capable of being detached from said fluid chamber.

2. The device according to claim 1, wherein said at least one valve device is formed by said at least one valve needle arranged co-axially to said at least one hollow needle and said at least one valve needle can be moved in an axial direction to contact a valve seat formed by an open end of said at least one hollow needle.

3. The device according to claim 2, wherein said at least one hollow needle is arranged firmly in a bottom of a trough forming said fluid chamber.

4. The device according to claim 2, wherein said at least one valve needle and said cover are attached to a closing block, with said at least one needle valve, said cover and said closing block being moveable away from said fluid chamber opening due to said control instrument.

5. The device according to claim 4, wherein said closing block forms said cover.

6. The device according to claim 5, wherein said at least one valve needle extends through a guide block fastened on said fluid chamber.

7. The device according to claim 1, wherein said control instrument has a pestle that affects, directly or indirectly, said valve device, said pestle is mechanically connected to a pressure pad which contacts said food item, with said pressure pad being longitudinally moveable relative to said at least one hollow needle.

8. The device according to claim 7, wherein said closing block carrying said at least one valve needle is prestressed elastically against said pestle.

9. The device according to claim 7, wherein said closing block is prestressed elastically in an opening direction of said at least one valve needle, and a pivoting control lever is positioned between said closing block and said pestle, said control lever transfers and increases a force of said pestle onto said closing block.

10. The device according to claim 9, wherein said fluid chamber and said cover are urged into contact with each other through said control lever and said closing block.

* * * * *